(12) United States Patent
Goedel

(10) Patent No.: US 10,126,178 B2
(45) Date of Patent: Nov. 13, 2018

(54) FAST RESPONSE TEMPERATURE SENSOR USING A POLYIMIDE ENCLOSED RTD

(71) Applicant: Unison Industries, LLC, Jacksonville, FL (US)

(72) Inventor: Jarodd Dan Goedel, Sherburne, NY (US)

(73) Assignee: Unison industries, LLC, Jacksonville, FL (US)

( * ) Notice: Subject to any disclaimer, the term of this patent is extended or adjusted under 35 U.S.C. 154(b) by 299 days.

(21) Appl. No.: 14/909,314

(22) PCT Filed: Jun. 17, 2014

(86) PCT No.: PCT/US2014/042646
§ 371 (c)(1),
(2) Date: Feb. 1, 2016

(87) PCT Pub. No.: WO2015/017035
PCT Pub. Date: Feb. 5, 2015

(65) Prior Publication Data
US 2016/0178449 A1 Jun. 23, 2016

Related U.S. Application Data

(60) Provisional application No. 61/861,222, filed on Aug. 1, 2013.

(51) Int. Cl.
*G01K 7/16* (2006.01)
*G01K 13/02* (2006.01)
*G01K 1/08* (2006.01)

(52) U.S. Cl.
CPC ............... *G01K 7/16* (2013.01); *G01K 1/08* (2013.01); *G01K 13/02* (2013.01)

(58) Field of Classification Search
CPC .. G01K 7/16; G01K 1/14; G01K 1/08; G01K 13/02
See application file for complete search history.

(56) References Cited

U.S. PATENT DOCUMENTS 4,174,512 A * 11/1979 Blatter ............... G01K 1/00
338/25
5,449,234 A * 9/1995 Gipp ............... G01K 7/25
338/22 R (Continued)

FOREIGN PATENT DOCUMENTS

DE 4442427 A1 6/1995
EP 0512694 A2 11/1992

(Continued)

OTHER PUBLICATIONS

International Search Report dated Sep. 24, 2014 which was issued in connection with PCT Patent Application No. PCT/US14/42646 which was filed on Jun. 17, 2014.

(Continued)

*Primary Examiner* — Lisa Caputo
*Assistant Examiner* — Philip Cotey
(74) *Attorney, Agent, or Firm* — Unison Industries, LLC; William Andes

(57) ABSTRACT

A fast-responding RTD assembly is provided having a housing including a cage having at least one flow through aperture, a cover disposed over at least one of the housing and the cage, a thin-walled RTD member having a first polyimide tape layer, a second polyimide tape layer sandwiching first and second lead tabs, and a conductor extending between the lead tabs, the thin-walled RTD located within the housing and held in position by a support structure first and second leads extending to the thin-walled member and corresponding to the first and second leads tabs, the thin-walled RTD member being one of curvilinear, (Continued)

linear, circular and spiral and minimizing contact with the housing to minimize conduction error.

15 Claims, 9 Drawing Sheets

(56) References Cited

U.S. PATENT DOCUMENTS

| | | | | |
|---|---|---|---|---|
| 2003/0056578 | A1* | 3/2003 | Mitchell | F01D 21/003 73/112.01 |
| 2005/0043907 | A1* | 2/2005 | Eckel | G01K 1/045 702/62 |
| 2005/0226308 | A1* | 10/2005 | Hudson | G01K 1/08 374/152 |
| 2011/0211614 | A1* | 9/2011 | Gmelin | G01K 1/14 374/208 |

FOREIGN PATENT DOCUMENTS

| | | |
|---|---|---|
| GB | 2251946 A | 7/1992 |
| WO | 2010142307 A1 | 12/2010 |

OTHER PUBLICATIONS

Iliopoulou et. al: "The dual thin-film probe for high-frequency flow temperature measurements", Proceedings of the Institution of Mechanical Engineers, Part A, Journal of Power and Energy, Mechanical Engineering Publications, Suffolk GB, vol. 219, No. Aw Sep. 1, 2005.

* cited by examiner

FAST RESPONSE TEMPERATURE SENSOR USING A POLYIMIDE ENCLOSED RTD

CROSS-REFERENCE TO RELATED APPLICATIONS

This application is a national stage application under 35 U.S.C. § 371(c) of prior filed, co-pending PCT application serial number PCT/US2014/042646, filed on Jun. 17, 2014, and claims priority to U.S. Provisional Application No. 61/861,222, titled "Fast Response Temperature Sensor Using a Polymide Enclosed RTD" and having filing date Aug. 1, 2013, all of which is incorporated by reference herein.

BACKGROUND

Present embodiments relate generally to gas turbine engines. More particularly, but not by way of limitation, present embodiments relate to a fast response temperature sensor using an enclosed resistance temperature detector (RTD).

A typical gas turbine engine generally possesses a forward end and an aft end with its several core or propulsion components positioned axially therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, and high-pressure and low-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy. The second stage turbine blades and rotor disk are mechanically coupled to a low pressure or booster compressor for driving the booster compressor and additionally an inlet fan.

During the operation of the gas turbine engine, it is necessary to obtain temperature readings at different locations in the engine. This data is utilized by the engine control logic to properly operate the engine and provide maximum performance at the highest efficiency. These probes utilize thermocouples, typically having a dissimilar metal to create a differential which may be then related to a temperature and which is provided to the engine control logic. These probes utilize type-K thermocouples typically having dissimilar metals to create a differential which may be then input to the engine control logic to optimize performance.

Some designs of fast response RTDs have had performance problems associated with conduction error due to large housing and/or because the RTD is encased in potting material. The housing or potting material increases the mass of the device and increases the path for heat to be transmitted to the sensor causing error. The errors in the sensors result in poor data being provided to engine control systems and less efficient engine operations.

As may be seen by the foregoing, it would be desirable to overcome these and other deficiencies with RTDs used in gas turbine engines so as to produce faster and more accurate temperature readings.

The information included in this Background section of the specification, including any references cited herein and any description or discussion thereof, is included for technical reference purposes only and is not to be regarded subject matter by which the scope of the innovation is to be bound.

BRIEF DESCRIPTION

According to present embodiments, a thin polyimide resistance temperature detector (RTD) is provided which is held in place by a thin walled member. The thin walled member minimizes the amount of mass and reduces the conduction error of the sensor. The mass of the polyimide cased RTD and housing is very small relative to prior art devices and reacts to small changes in temperature. Thus a fast responding RTD is provided for various locations including, but not limited to, inlet air, under cowl air and general air temperatures.

According to some embodiments, a fast-responding RTD assembly, comprises a housing including a cage having at least one flow through aperture, a cover disposed over at least one of the housing and the cage, a thin-walled RTD member having a first polyimide tape layer, a second polyimide tape layer sandwiching first and second lead tabs and a conductor extending between the lead tabs, the thin-walled RTD located within the housing and held in position by a support structure, first and second leads extending to the thin-walled member and corresponding to the first and second leads tabs, the thin-walled RTD member being one of curvilinear, linear, circular and spiral and the support structure minimizing contact with the housing to minimize conduction error.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the innovation may be gleaned from the disclosure herein. Therefore, no limiting interpretation of this summary is to be understood without further reading of the entire specification, claims, and drawings included herewith. A more extensive presentation of features, details, utilities, and advantages of the present innovation is provided in the following written description of various embodiments of the innovation, illustrated in the accompanying drawings, and defined in the appended claims.

BRIEF DESCRIPTION OF THE DRAWINGS

The above-mentioned and other features and advantages of this disclosure, and the manner of attaining them, will become more apparent and the process sensor will be better understood by reference to the following description of embodiments taken in conjunction with the accompanying drawings, wherein.

DETAILED DESCRIPTION

Figure 1:
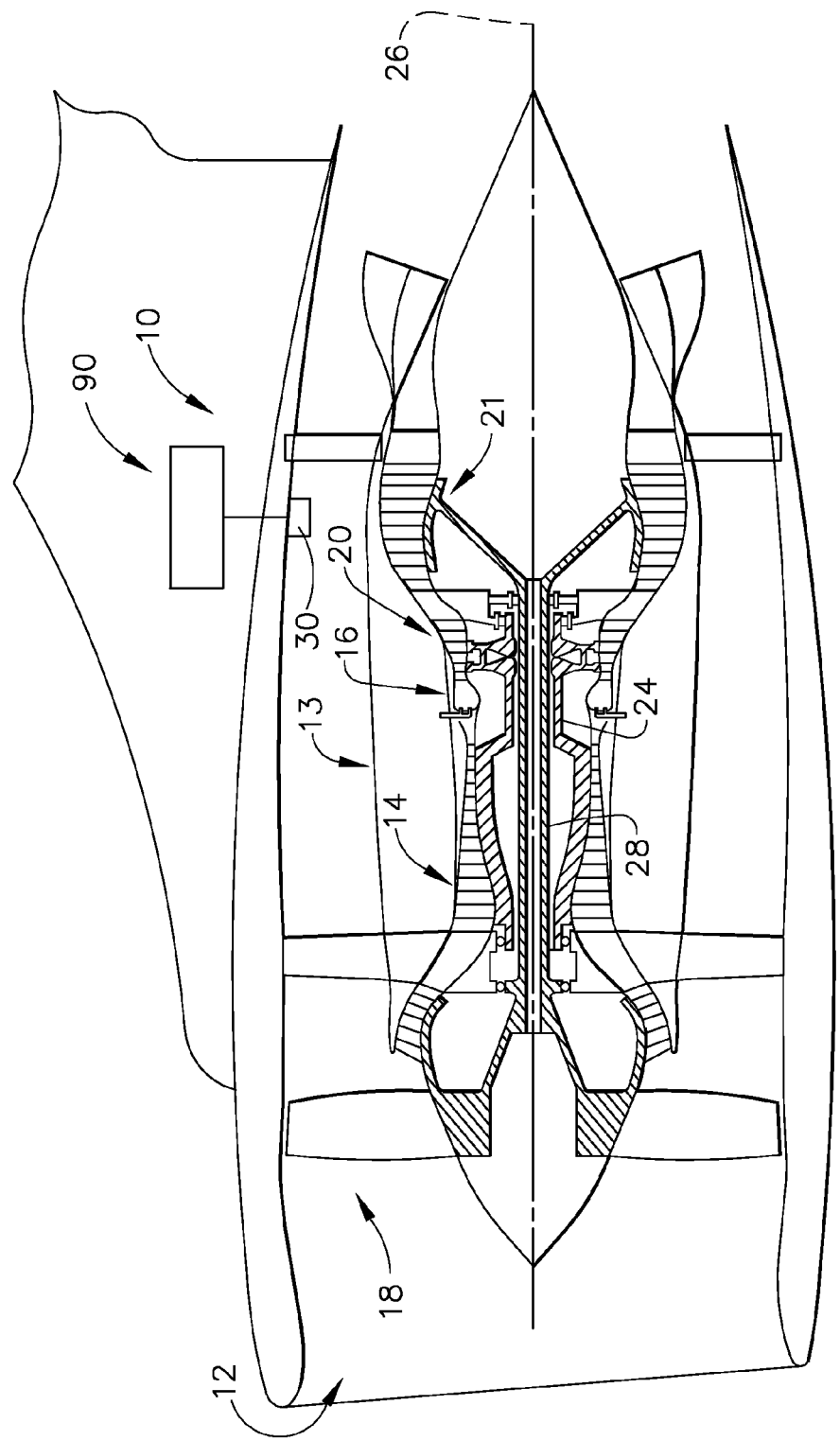
FIG. 1 is a side section view of a gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that embodiments of the present innovation cover such modifications and variations as come within the scope of the appended claims and their equivalents.

Referring to FIGS. 1-9 various embodiments of a fast response temperature sensor or resistance temperature detector (RTD) are provided in the form of a thin-walled member. The instant embodiments of the thin walled member utilize a polyimide tape to encase a sensor material. The polyimide tape and sensor is then placed within a cage which is connected to a housing. The various embodiments minimize contact with structures of the assembly that may cause conduction error during operation.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown having an engine inlet end 12 wherein air enters the propulsor or core 13 which is defined generally by a compressor 14, a combustor 16 and a multi-stage high pressure turbine 20. Collectively, the propulsor 13 provides thrust or power during operation. Although the gas turbine engine 10 is shown in an aviation embodiment, such example should not be considered limiting as the gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the high pressure shaft 24. The high pressure shaft 24 passes toward the front of the engine to continue rotation of the one or more compressor stages 14, a turbofan 18 or inlet fan blades, depending on the turbine design. The turbofan 18 is connected by the low pressure shaft 28 to a low pressure turbine 21 and creates thrust for the turbine engine 10. The low pressure turbine 21 may also be utilized to extract further energy and power additional compressor stages. The low pressure air may be used to aid in cooling components of the engine 10 as well.

The gas turbine engine 10 is axis-symmetrical about engine axis 26 so that various engine components rotate thereabout. An axi-symmetrical high pressure shaft 24 extends through the turbine engine forward end into an aft end and is journaled by bearings along the length of the shaft structure. The shaft 24 rotates about a centerline 26 of the engine 10. The high pressure shaft 24 may be hollow to allow rotation of a low pressure turbine shaft 24 therein and independent of the high pressure shaft 24 rotation. The low pressure shaft 24 also may rotate about the centerline axis 26 of the engine. During operation the shafts 24, 28 rotate along with other structures connected to the shaft such as the rotor assemblies of the turbine in order to create power or thrust for various types of turbines used in power and industrial or aviation areas of use.

Referring still to FIG. 1, the schematic view shows a controller 90 which is connected by a cable assembly to one or more resistance temperature detector (RTD) assemblies 30 spaced about the engine 10. The RTD assemblies 30 may be utilized for general temperature monitoring throughout the engine structure. The RTD assembly 30 is connected to lead wires that extend by way of plug or harness connection and cables to a controller 90 for providing a signal to the controller 90. The plug connector or harness may be push-pull type or a screw type, for example male or female, with a hex nut for tightening to an adjacent connector, for example of a RTD assembly 30. The cables each include at least one conductor. The cables may be formed of copper or copper-based material which is much lower cost than the thermoelectric wires or conductors utilized in the RTD assembly 30.

In operation, the RTD assembly 30 is provided a power input on the order of, for non-limiting example, about 1-10 milliamps. The resistance of the RTD changes based on temperature. The resistance of the RTD is also sent as a signal to the controller 90 by way of cables and the measured resistance at the controller 90 may be converted to a temperature at the RTD assembly 30. The controller 90 determines temperature inputs and may be utilized by the engine avionics to make logic decisions in flight control based upon the input, for example air temperatures, provided.

Figure 2:
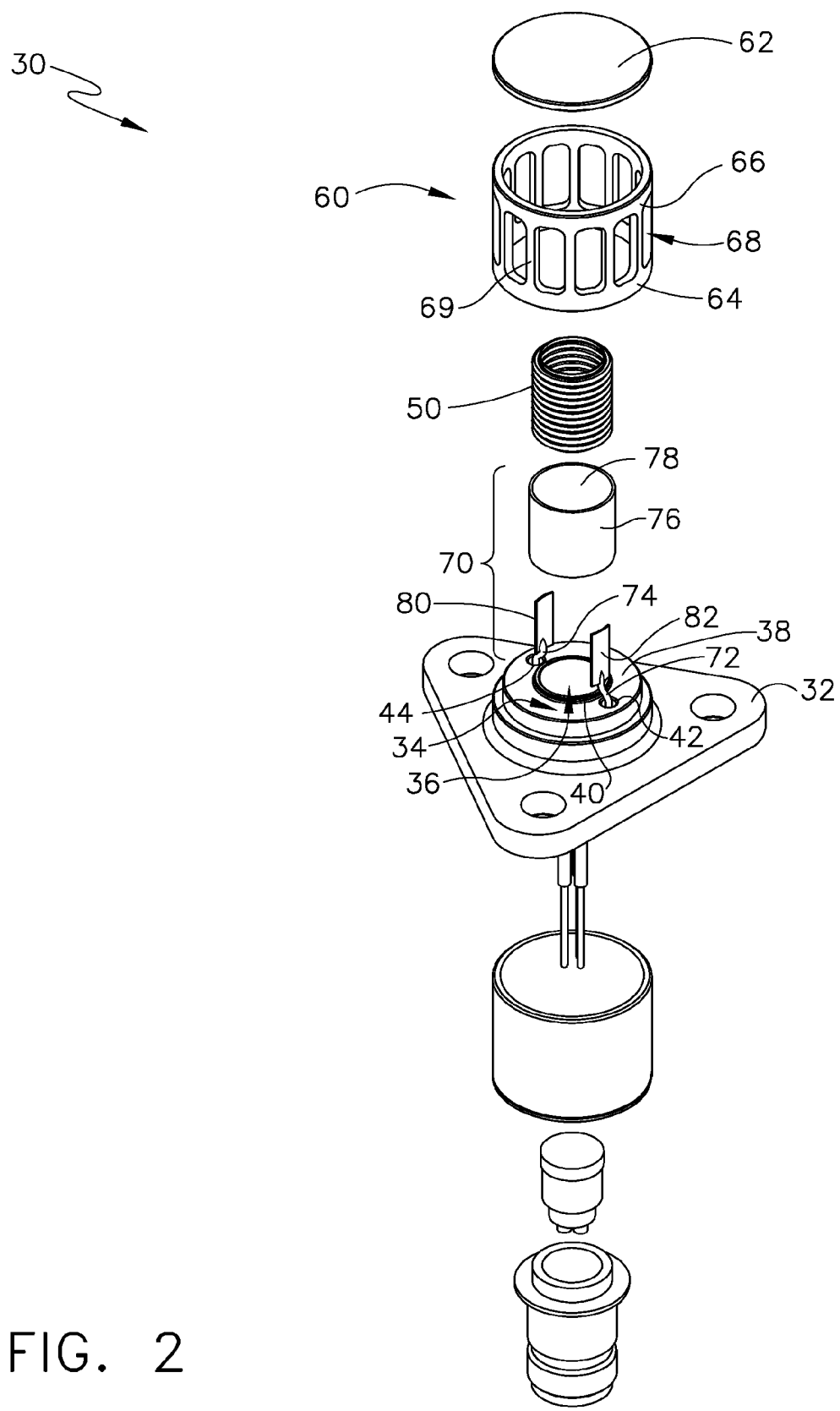
FIG. 2 is an exploded view of one embodiment of a fast response temperature sensor in accordance with various aspects described herein.

Referring now to FIG. 2, an exploded isometric view of a first embodiment of a fast temperature response RTD assembly 30 is depicted. The assembly includes a temperature sensor mount 32 which may be formed in various structural configurations and may be located at multiple locations of an aircraft engine, for example at an air inlet, under cowl air location or any general air temperature sensing location necessary. The temperature sensor mount 32 may be formed of various metals including, but not limited to, Inconel for example.

Connected to the temperature sensor mount 32 is a housing 34 which may be formed of the same material as the sensor mount 32 or may be of a different material. The housing 34 may be formed integrally with the temperature sensor mount 32 or may be formed separately and press fit, welded or brazed into position. The housing 34 of the instant embodiment is cylindrical in shape and includes a hollow portion 36. The upper surface 38 of the housing 34 includes a housing flange 40 which engages a support structure 50, for example a bellow extending upwardly from the upper surface 38 of the housing 34. The bellow 50 provides structural support for a Resistance Temperature Detector (RTDs) 70 extending about the bellow 50 while minimizing contact with the RTD. The minimized contact is provided in this embodiment by the curvilinear shape of the bellow 50. RTDs are used to measure temperature by correlating resistance of the RTD element with temperature. The materials used within the RTD have known or predictable change in resistance with change in temperature. Therefore by measuring the resistance during usage, the temperature of a gas flow may be determined at the location of the RTD. Various types of RTDs include thin film, wire-wound and coiled elements.

Figure 3:
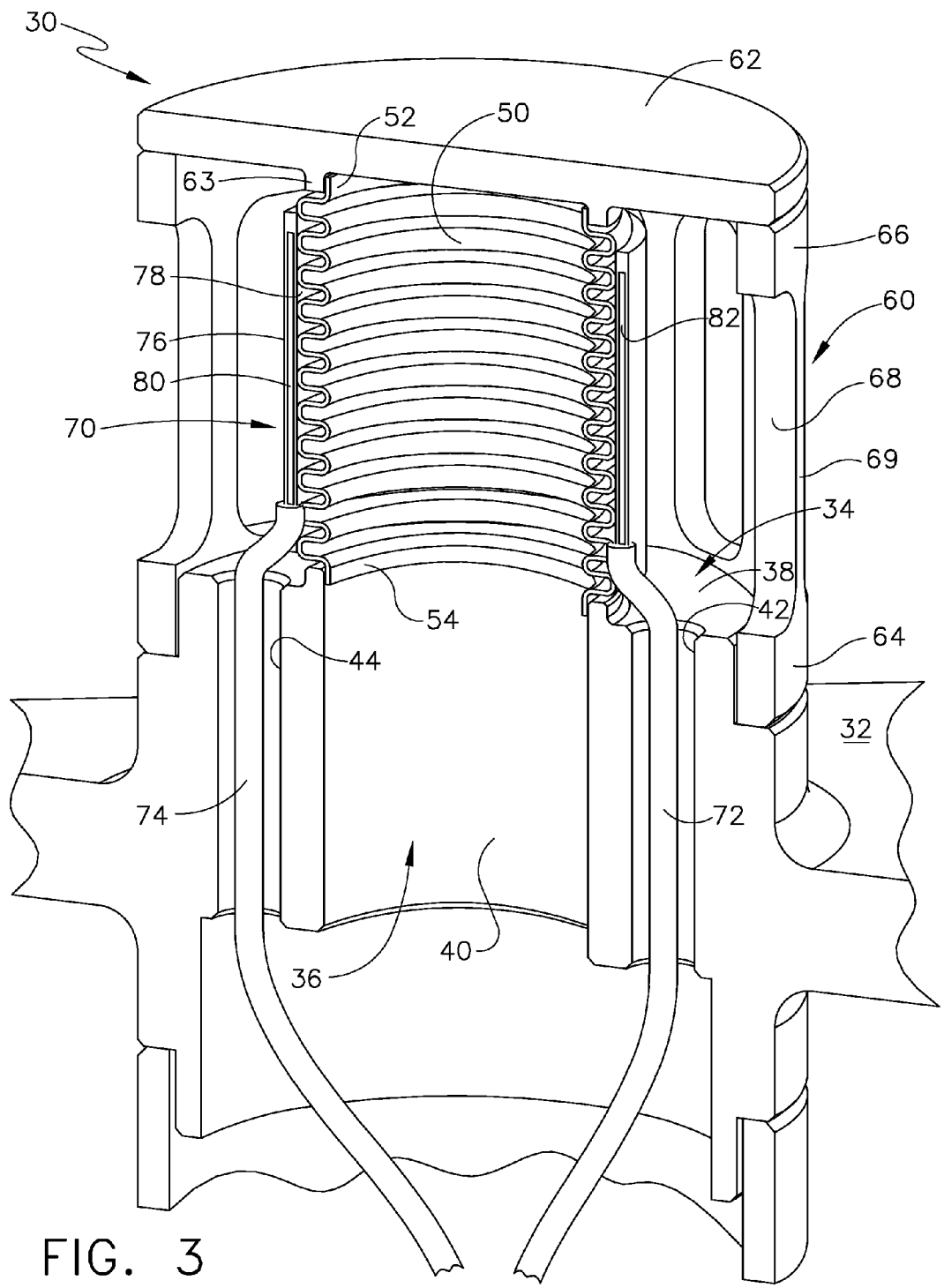
FIG. 3 is an assembled section view of the embodiment of FIG. 2.

The housing 34 includes housing lead holes 42, 44. Lead wires 72, 74 extend upwardly through the housing 34 by way of the lead holes 42, 44 to provide electrical communication with the thin film RTD 70 disposed above the upper housing surface 38. Above the housing 34 is a cage 60 and above the cage 60 is a cover 62. The cover 62 includes an upper cover flange 63 (FIG. 3) which engages the bellow 50 at flange 52 (FIG. 3). Thus the bellow 50 is captured between the cover 62 and the housing 34.

The cage 60 includes a cage lower portion 64, upper portion 66, a sidewall 69 extending therebetween and a plurality of windows 68 defined in the sidewall 69. The at least one flow opening 68 allows air to pass through the cage and engage the RTD 70. Each of the openings 68 may be formed of various shapes. The instant embodiment depicts vertical sidewalls which are linear in nature with curved upper and lower portions. However, such design is merely exemplary as various window shapes may be utilized, for example circular, oval shaped, rectangular, square or other known geometric configurations may be utilized depending on flow characteristics to allow desired flow characteristics through the cage 60 and over the RTD 70.

Referring now to FIG. 3 an assembled section view of the RTD assembly 30 is depicted. The lead wires 72, 74 extend through the housing 34 and through the lead holes 42, 44. The lead wires 72, 74 engage the thin film RTD 70 and provide electrical communication between the RTD 70 and the controller 90 (FIG. 1). The RTD 70 is formed of a first layer of polyimide tape 76, a second layer of polyimide tape 78 and lead tabs 80, 82 which are each in electrical communication with a conductor such as wire windings. The RTD 70 is formed by placing the lead tabs 80, 82 on a first layer of polyimide tape 76 on a first side and a second layer of polyimide tape 78 on a second side. The leads 80, 82 are joined in electrical communication by the windings. The polyimide tape 78 sandwiches the lead tabs 80, 82 and wire windings therein. The RTD 70 is then placed on the bellow 50 and placed in an autoclave at high temperature and vacuum pressure to bond the two pieces together. In addition to the flanges 52, 54, the bellow 50 includes a curvilinear sidewall between the bellow flanges 52, 54. The curvilinear sidewall is formed of peaks and valleys which are bonded to the RTD 70 within the autoclave at high temperature and vacuum pressure. The curvature provides for minimum contact between the film RTD 70 and the mass of the bellow 50. Thus, the arrangement reduces air while still providing a fast response for the RTD 70 by limiting conduction air associated with increasing mass connected to an RTD 70. The bellow 50 further provides support for the RTD 70 so that the airflow does not move or otherwise damage the RTD 70 during operation of the RTD 70, for example in an aircraft engine.

Figure 4:
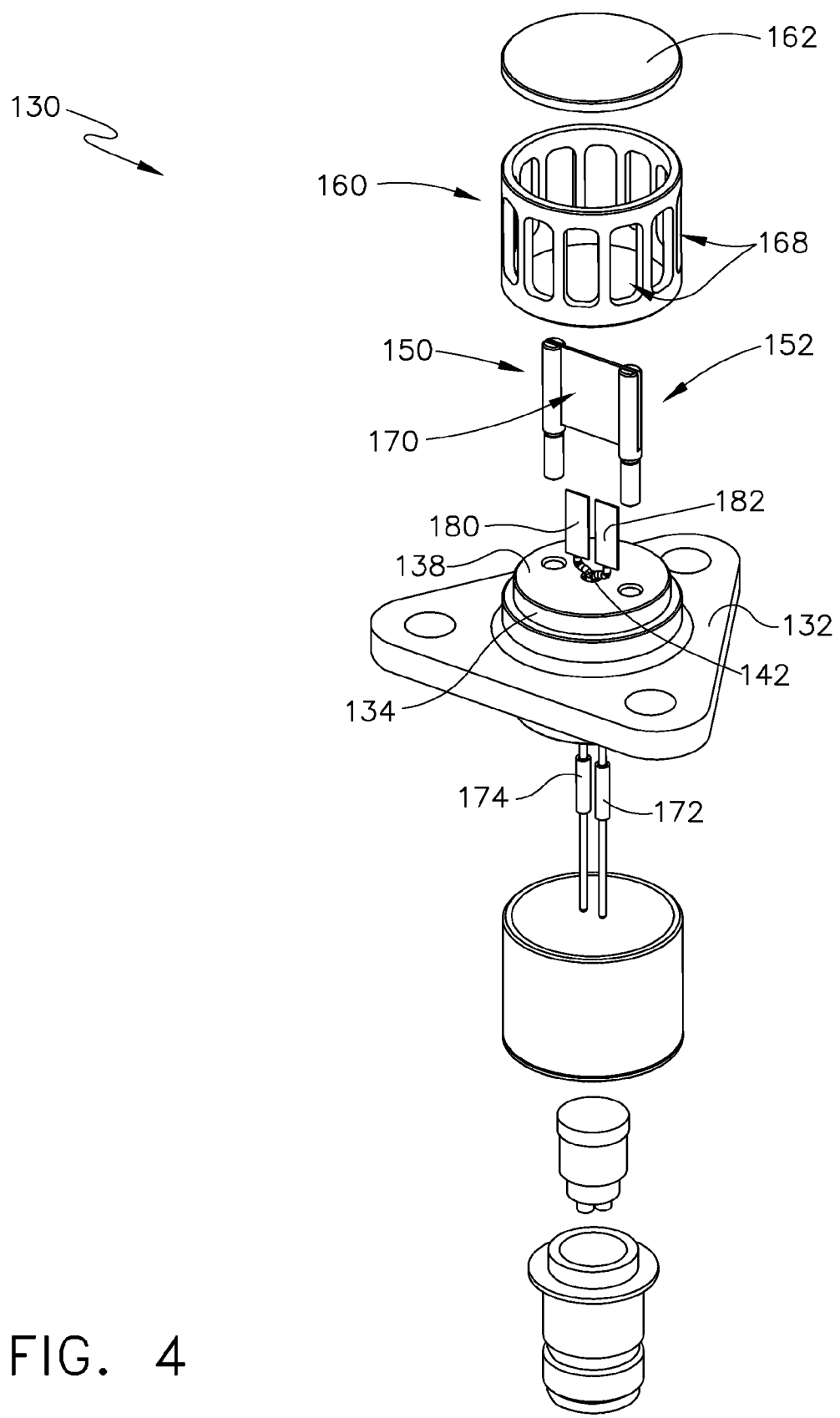
FIG. 4 is an exploded view of a second embodiment of a fast response temperature sensor.

Referring now to FIG. 4, an exploded view of an alternate RTD assembly 130 is depicted. The embodiment utilizes a temperature sensor mount 132 similar to the previously described design. As also described, the sensor mount 132 may take various forms and is not limited to the depicted embodiment provided in the instant disclosure. The structure further comprises a housing 134 which may be integrally connected or separately formed and subsequently joined to the temperature sensor mount 132. The housing 134 is surrounded by a cage 160 having a plurality of flow-through openings 168. Disposed above the cage 160 is a cover 162 which forces airflow to move through the cage 160 and engage the RTD 170 therein. The instant embodiment utilizes at least one lead hole 142 within the housing 134 through which leads 172, 174 extend to the RTD 170. However, two lead holes may also be utilized if desirable.

Figure 5:
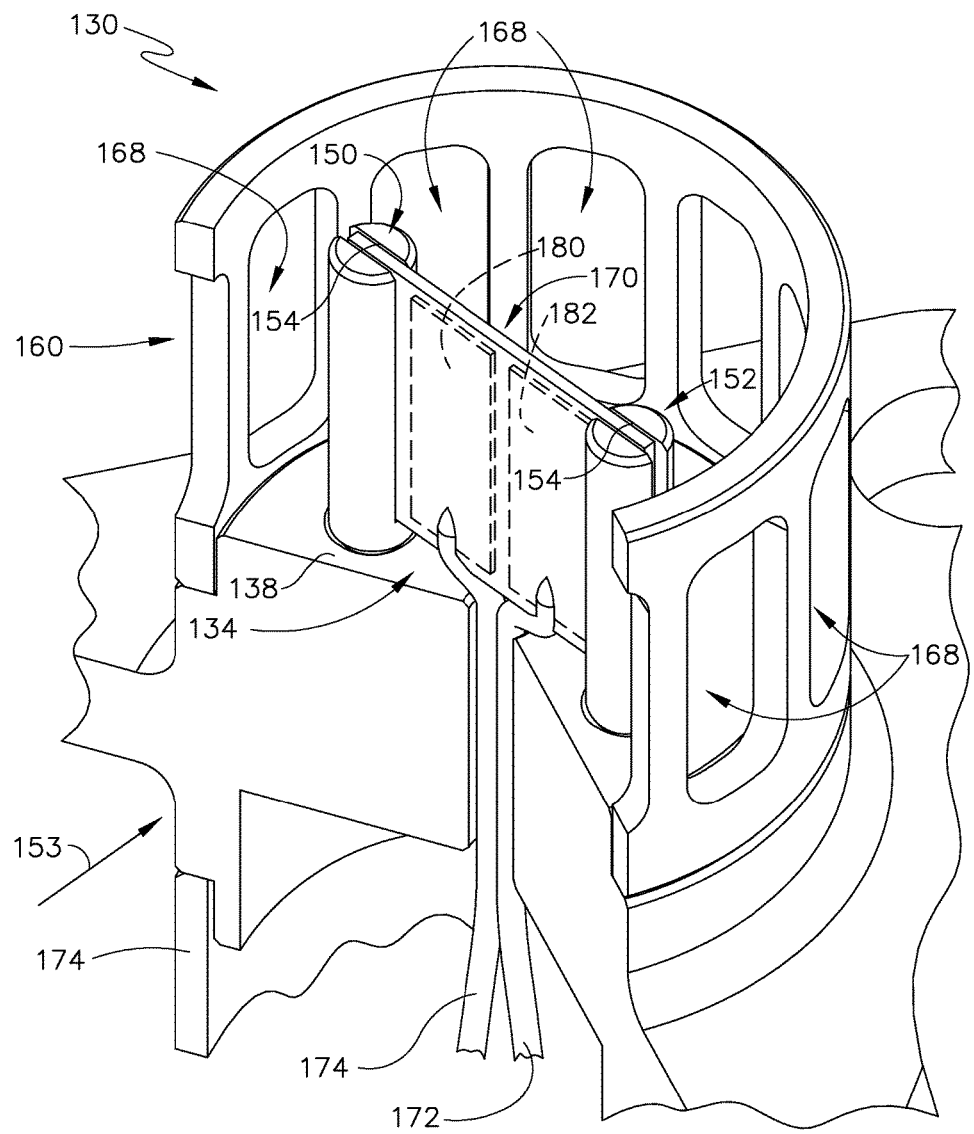
FIG. 5 is section view of the second embodiment of FIG. 4.

Extending from the upper surface 138 of the housing 134 are support structures 150, for example posts 152 which include slots 154 (FIG. 5). The posts 150, 152 function to retain the RTD 170 in place while having minimal contact with the RTD 170 so as to decrease conduction error.

The RTD 170 is linear rather than circular as in the previous embodiment and is inserted in each of the slots 154 of the posts 150, 152. In this embodiment, airflow 153 (FIG. 5) moves in the direction which is perpendicular to the surface of the RTD 170 so as to maximize engagement of the airflow with the RTD 170 and providing the temperature information to a controller.

As with the previous embodiment, the thin walled RTD 170 is formed of a polyimide tape first layer and a polyimide tape second layer which sandwich lead tabs 180, 182 having electrical communication with windings within the thin film RTD assembly 170.

Referring now to FIG. 5, an assembled isometric section view of the RTD assembly 130 is depicted. The housing 134 extends from a mount 132 (FIG. 4) and the cage 160 surrounds the housing 134 with a plurality of holes 168 to allow airflow therethrough. The RTD 170 extends between the posts 150, 152 and maximizes airflow 153 engagement. In this embodiment, it is desirable that the airflow 153 be substantially perpendicular to the plane of the RTD 170. As the RTD 170 varies in temperature due to the airflow 153, the resistance of the structure changes and the electrical data is conveyed by leads 172, 174 to a controller to determine temperature passing through the RTD 170. The RTD 170 is inserted in the slots 154 and the lead tabs 180, 182 do not engage the slots and posts 152, 154 so that conduction error due to the mass of the posts and the housing is minimized.

Figure 6:
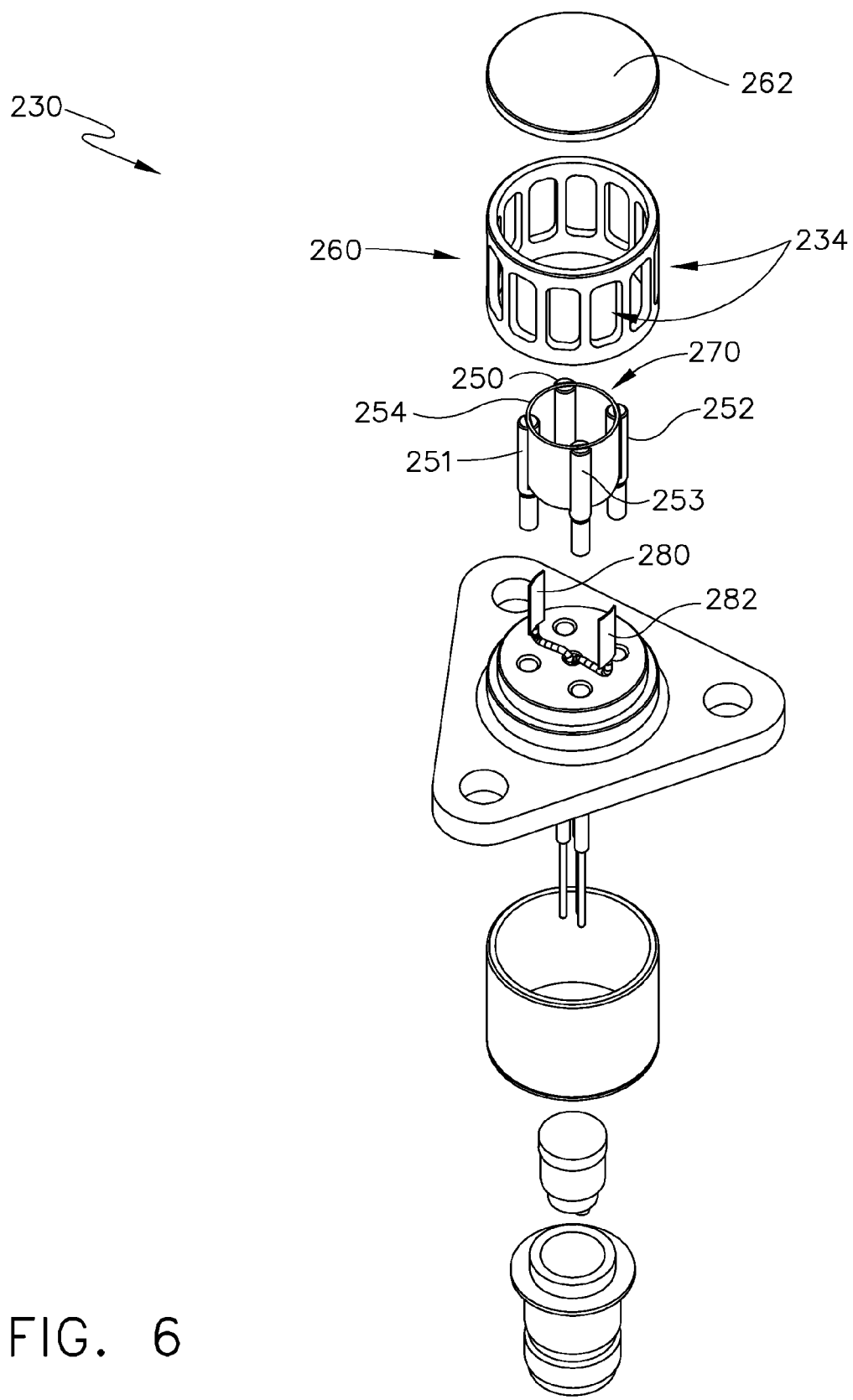
FIG. 6 is an exploded view of a third embodiment of a fast response temperature sensor.

Referring now to FIG. 6, an exploded view of RTD assembly 230 is depicted. According to this embodiment, the housing 234 is surrounded by the cage 260 and cover 262. The RTD 270 is circular in shape and disposed and maintained in position within the airflow 255 (FIG. 7) by means of four support structures, for example posts 250, 251, 252, 253. Each of the posts 250, 251, 252, 253 includes a slot 254 wherein the RTD 270 is retained. By utilizing the four posts, the circular shape of the RTD 270 is achieved and the airflow 255 can move in any direction relative to the RTD 270 as opposed to the previous embodiment wherein the airflow should be perpendicular to the circumferential surface of the RTD 170.

As previously described, the RTD 270 utilizes polyimide tape in first and second layers to sandwich lead tabs 280, 282 as well as wire windings or other such windings therein.

Figure 7:
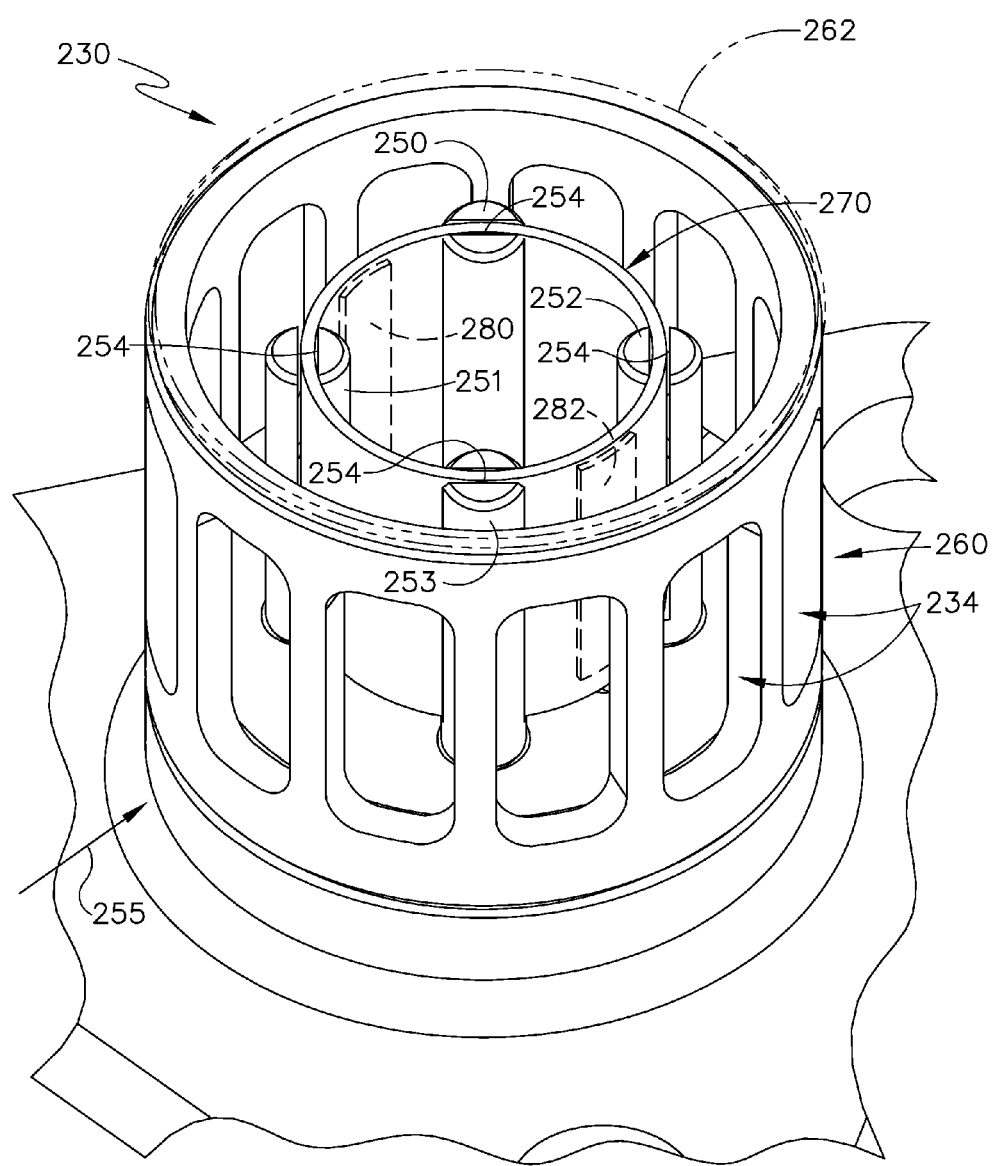
FIG. 7 is an assembled isometric view of the embodiment of FIG. 6.
Figure 8:
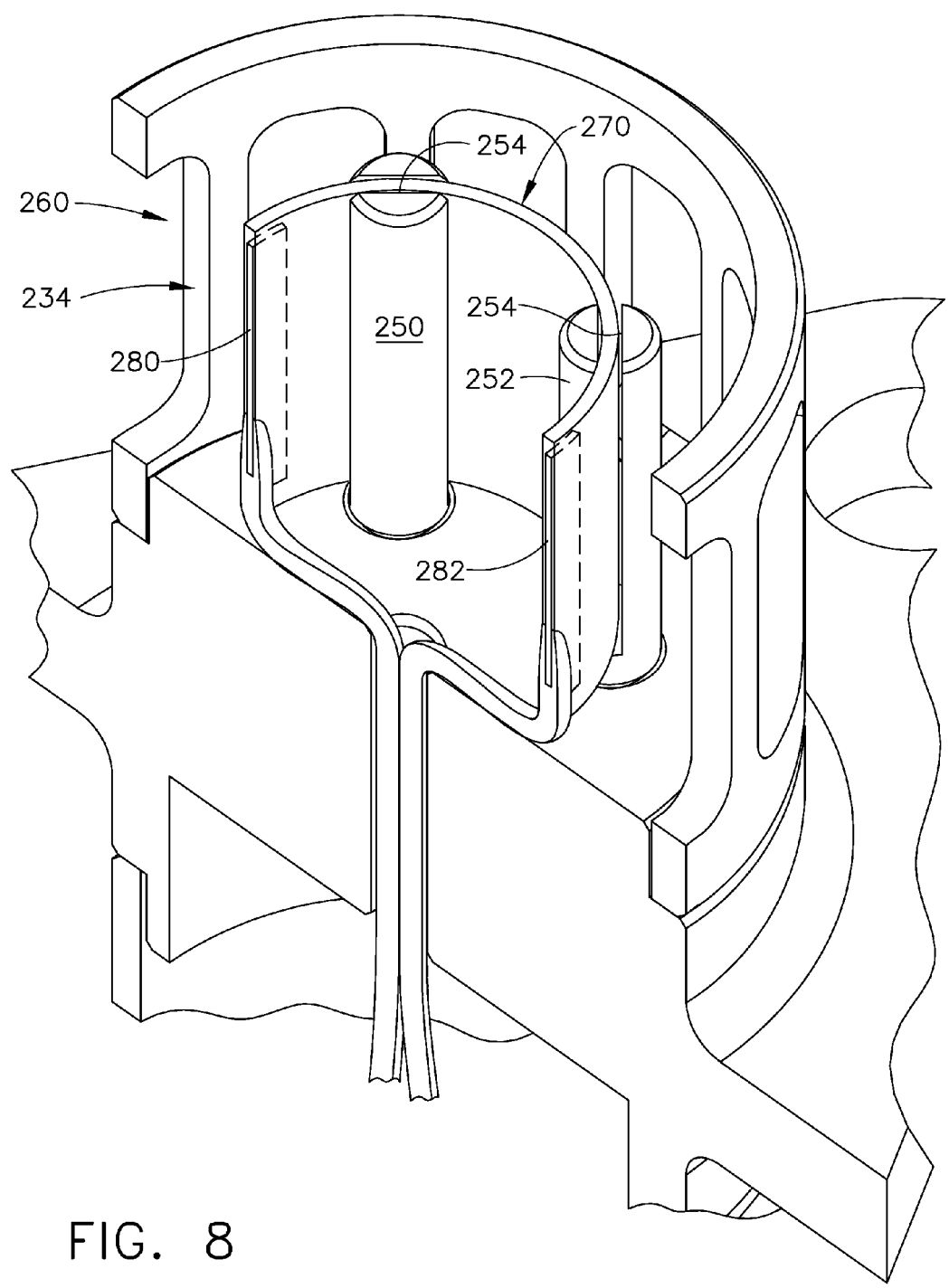
FIG. 8 is a section view of the assembly of FIG. 7.

With reference to FIGS. 7 and 8, the RTD assembly 230 is depicted in isometric view and sectioned isometric view, respectively. The airflow 255 is indicated as moving through the openings of cage 260 and engages the circular shaped RTD 270. The lead wires extend to the tabs 280, 282 so as to provide electrical resistance data back to the controller which may utilize such information to determine temperature at the RTD 270. Additionally, the usage of slots 254 again minimizes contact with the RTD 270 and conduction error associated with such contact. Other contact minimizing features may be utilized.

Figure 9:
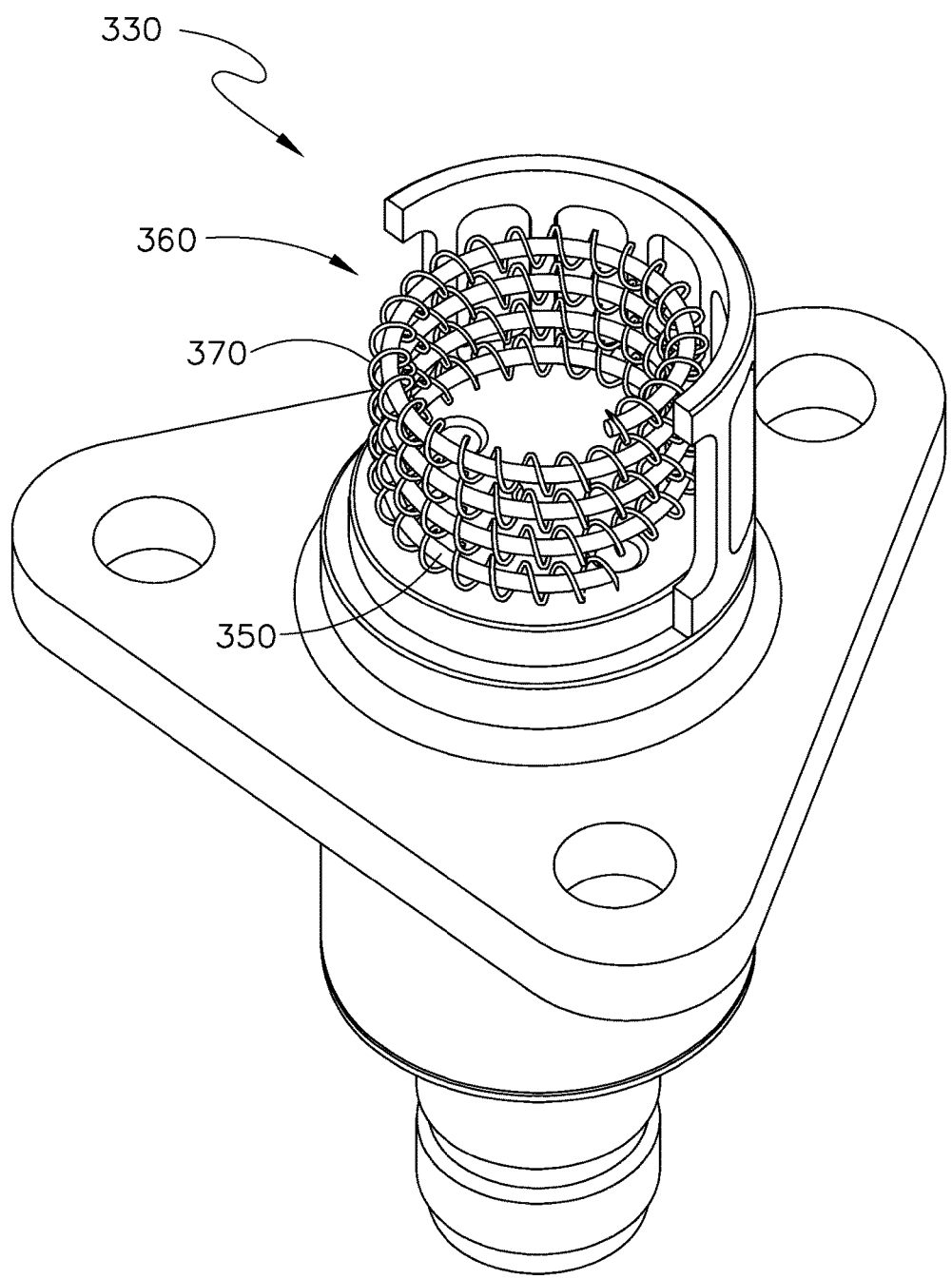
FIG. 9 is a further embodiment of a fast response temperature sensor.

Referring now to FIG. 9, an additional RTD assembly 330 is depicted wherein the RTD 370 is formed of a spiral structure about a spiral support structure 350 and located within the cage 360. The spiral structure again limits contact with other masses so as to reduce conduction error, but is still stable enough for use in rigorous application settings, for example aircraft engines.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A resistance temperature detector (RTD) assembly, comprising:
   a housing including a cage having at least one flow through aperture;
   a cover disposed over at least one of said housing and said cage;
   a thin film RTD member having a first polyimide tape layer, a second polyimide tape layer sandwiching first and second lead tabs and a conductor extending between said lead tabs;
   said thin film RTD member located within said housing and held in position by a support structure;
   first and second leads extending to said thin film RTD member and corresponding to said first and second leads tabs; and, said thin film RTD member being one of cylindrical, planar, and spiral shape.

2. The RTD assembly of claim 1, said support structure further comprising first and second posts.

3. The RTD assembly of claim 2, said thin film RTD member extending between said first and second posts.

4. The RTD assembly of claim 3, said first and second posts having slots for receiving said thin film RTD.

5. The RTD assembly of claim 2 further comprising third and fourth posts.

6. The RTD assembly of claim 5, said posts having slots for receiving said thin film member.

7. The RTD assembly of claim 1 said support structure being a bellow.

8. The RTD assembly of claim 7, wherein said thin film RTD member extends about said bellow.

9. The RTD assembly of claim 8 said bellow having a plurality of peaks and valleys minimizing contact with said thin film RTD.

10. The RTD assembly of claim 1, said cage being substantially hollow.

11. The RTD assembly of claim 1 said cover further comprising a flange.

12. The RTD assembly of claim 1, said thin film RTD member forming a spiral shaped structure.

13. The RTD assembly of claim 12, said spiral shaped structure disposed within said cage.

14. The RTD assembly of claim 1, said thin film RTD assembly being in electrical connection with a controller.

15. The RTD assembly of claim 1, said housing having at least one hole for said leads.

* * * * *